United States Patent
Gau

[11] Patent Number: 5,126,232
[45] Date of Patent: Jun. 30, 1992

[54] POLE DESIGN FOR THIN FILM MAGNETIC HEADS

[75] Inventor: George J. Gau, Minnetonka, Minn.

[73] Assignee: Seagate Technology, Inc., Scotts Valley, Calif.

[21] Appl. No.: 744,826

[22] Filed: Aug. 12, 1991

Related U.S. Application Data

[60] Continuation of Ser. No. 458,557, Dec. 28, 1989, abandoned, which is a division of Ser. No. 358,122, May 26, 1989, Pat. No. 4,970,615.

[51] Int. Cl.$^5$ .................................................. G03C 5/00
[52] U.S. Cl. ................................... 430/320; 430/313; 430/318; 430/330; 430/319
[58] Field of Search ................ 430/313, 328, 329, 320, 430/330

[56] References Cited

U.S. PATENT DOCUMENTS

| | | | |
|---|---|---|---|
| 4,434,445 | 2/1984 | Van Herk | 360/121 |
| 4,443,294 | 4/1984 | Suenaga et al. | 156/656 |
| 4,536,421 | 8/1985 | Matsuzawa et al. | 430/313 |
| 4,700,253 | 10/1987 | Gerber et al. | 360/122 |
| 4,701,820 | 10/1987 | McClure | 360/125 |
| 4,814,243 | 3/1989 | Ziger | 430/330 |
| 4,900,650 | 2/1990 | Das | 430/314 |

OTHER PUBLICATIONS

T. Lwakura et al., Three Dimensional Simulation of Side Writing Field and for Thin Film Heads with Pole Shapes, International Conference on Magnetic, Apr. 1989, Washington, D.C.

Primary Examiner—Marion E. McCamish
Assistant Examiner—S. Rosasco
Attorney, Agent, or Firm—Kinney & Lange

[57] ABSTRACT

A thin film magnetic head including top and bottom pole tips having reversed trapezoidal cross sections. Mirror image symmetry across a gap region may be achieved. The top and bottom pole tips may be formed using a photolithographic process using positive photoresist including post bake and flood exposure steps.

2 Claims, 4 Drawing Sheets

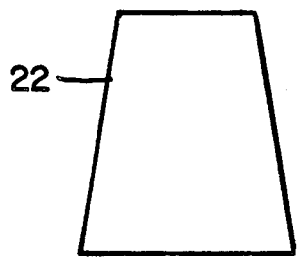
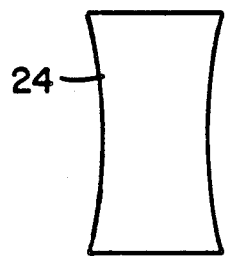
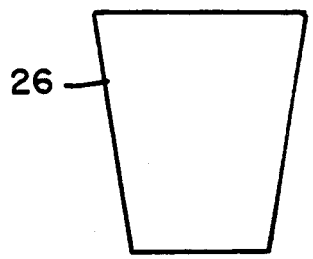
Fig. 3A     Fig. 3B     Fig. 3C
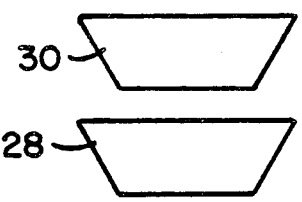
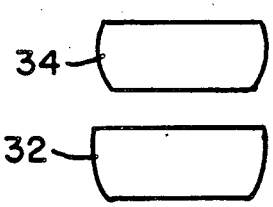
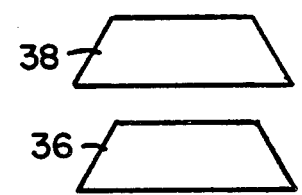
Fig. 4A     Fig. 4B     Fig. 4C
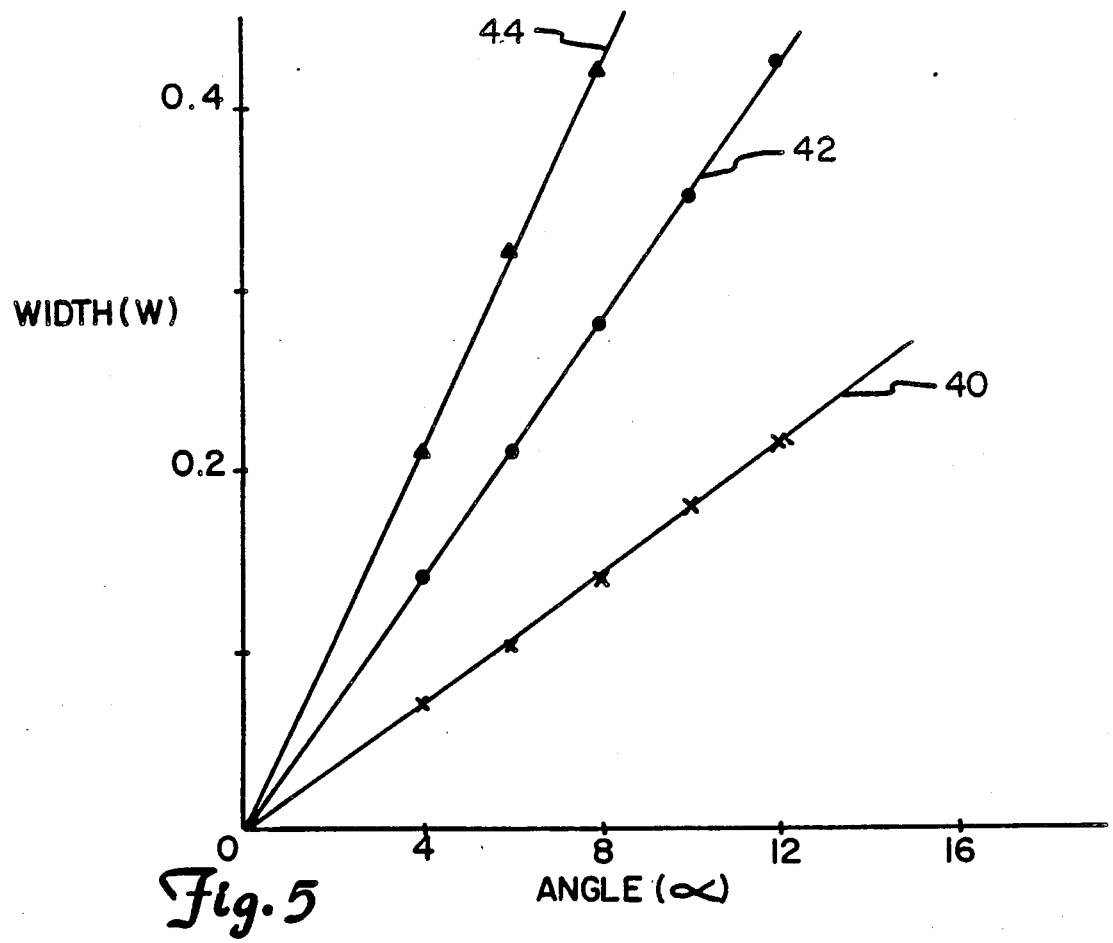
Fig. 5

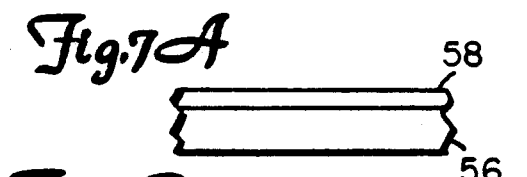
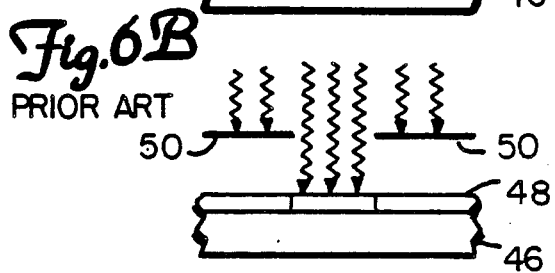
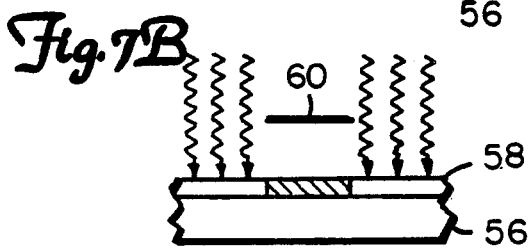
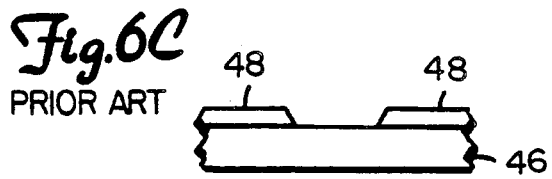
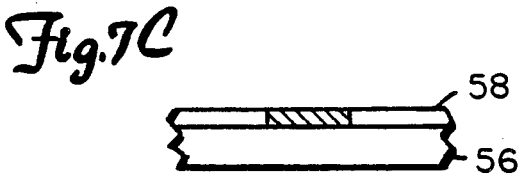
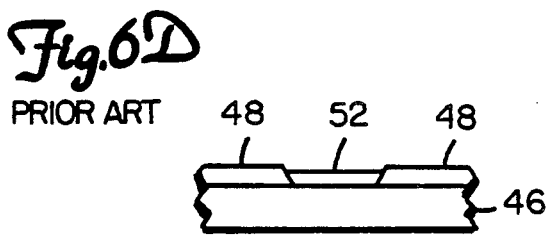
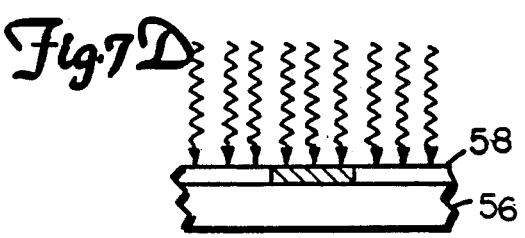
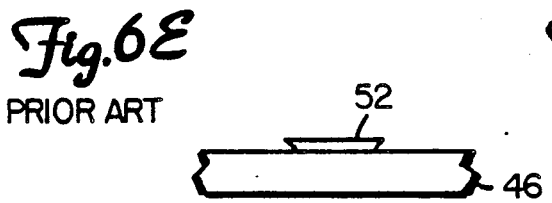
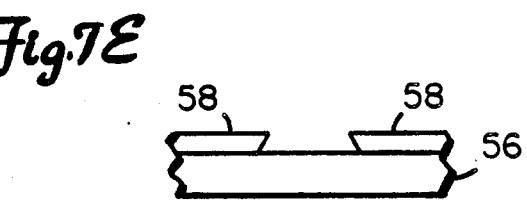
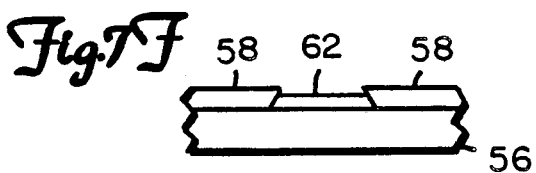
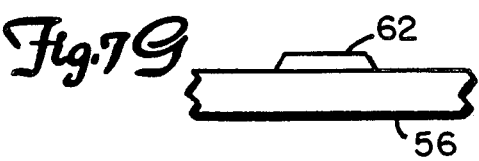

POLE DESIGN FOR THIN FILM MAGNETIC HEADS

This is a continuation of application Ser. No. 07/458,557 filed on Dec. 28, 1989, abandoned as of the date of this application, which is a divisional of application Ser. No. 07/358,122 filed on May 26, 1989, now U.S. Pat. No. 4,970,615.

BACKGROUND OF THE INVENTION

1. Field of the Invention

The present invention relates to thin film magnetic heads. In particular the invention relates to an improved pole tip design for thin film magnetic heads.

2. Description of the Prior Art

Thin film magnetic read/write heads are used for magnetically reading and writing information on a magnetic storage medium such as a magnetic disk or a magnetic tape. It is highly desirable to provide high levels of information storage densities on the magnetic storage medium.

One design criteria in a recording system is to provide an areal density as high as possible for a given recording surface without compromising the performance/cost ratio. In the case of rotating disk drives (both floppy and hard discs) the areal density is found by multiplying the number of flux reversals per unit length along the track (linear density in units of flux reversals per inch) by the number of tracks available per unit length along the radial direction (track density in units of tracks per inch). The areal density has shown a steady increase, doubling about every other three years. A state-of-the-art density is about 100 million bits per inch squared, and the commercial magneto-optic disc has an areal density of 480 million bits per inch squared.

In the past, great efforts have been devoted to maximizing the linear density A higher linear density can be attained by reducing the gap length of the recording head. Furthermore, most attention has been paid to improving the media's characteristics to support shorter magnetic domain transitions such that a higher bit density is realized. This has been successfully accomplished mainly through a better understanding of the recording physics and micromagnetics. For instance, magnetic media made by deposition processes which lead to a morphology of isolated particles will have a better resolution and higher signal-to-noise ratios. T. Chen, and T. Yamashita, IEEE Trans Mag. MAG-24 (1988) p. 2700.

To further boost the areal density, a great opportunity lies in the avenue of increasing track density. It would be particularly useful if this could be done using the positive photoresist presently widely in use through out the industry.

SUMMARY OF THE INVENTION

The present invention provides improved track density through a better-controlled lithographic process for the thin film head fabrication. A better pole tip design may be obtained by controlling the resist profile. Pole tips are provided having trapezoidal shape in which the shorter of the two parallel sides for each pole tip is closest the gap. A particular geometry is shown in which two pole tips have substantial mirror image symmetry across the gap region.

Pole tips in accordance with the present invention may be manufactured using a photolithographic process in which a positive photoresist layer is deposited and the portion which is to form the pole tip is exposed to radiation while the portion where the pole tip is to be deposited is masked off. The photoresist is then baked followed by a flood exposure. The resist is then developed, removing that portion which was masked off during the first exposure. The walls of the remaining photoresist have "negative" slopes. The pole tip may then be deposited in the relief area and will have walls with a "positive" slope. The gap and upper pole tip may then be deposited using standard lithographic techniques. The resulting pole structure provides pole tips having a trapezoidal shape symmetry across the gap region.

BRIEF DESCRIPTION OF THE DRAWINGS

FIG. 3 A-C shows three photoresist profiles.

FIG. 4 A-C shows the resulting pole tip structure when the photoresist profiles of FIG. 3 are used in fabrication of the pole tips in a thin film head.

FIG. 5 is a graph showing the relationship between the slope of the pole tip and the difference in pole tip width between the top and bottom edges of the pole tip for three different pole tip heights.

FIGS. 6 A-C and 7 A-C show a side by side comparison between the prior art method of forming pole tips (FIG. 6) and a method of the present invention (FIG. 7).

DETAILED DESCRIPTION OF THE PREFERRED EMBODIMENT

The quest for high density recording on magnetic storage media has essentially given rise to the development of miniature integrated thin film heads. Thin film heads, being substantially two-dimensional, permit the use of magnetic films with higher permeability and higher saturation induction, resulting in better performance in terms of high resolution and low inductance. In addition, the ability to fabricate the heads in an array is an advantage of thin film heads.

Magnetic heads are an integral part of an air bearing slider which "flies" over the disk surface. The slider is typically made of sintered ceramics such as a composite of alumina oxide and titanium carbide. In some cases, a magnetic substrate such as the Ni-Zn ferrite is used as a shielding material. The batch fabrication of magnetic heads using thin film techniques thus differs greatly from semiconductor manufacturing.

The batch fabrication of vertically configured thin film magnetic recording heads was summarized by Romankiw et al. See L. T. Romankiw, and P. Simon, IEEE Trans. Mag. MAG-11 (1975) p. 50. This kind of head design is more stable but requires additional machining techniques, such as micro-scale lapping and grinding for fabrication. The vertically configured thin film head has since evolved into a more sophisticated design featuring unique paddle shaped poles and a multi-turn/layer coil pattern.

Figure 1:
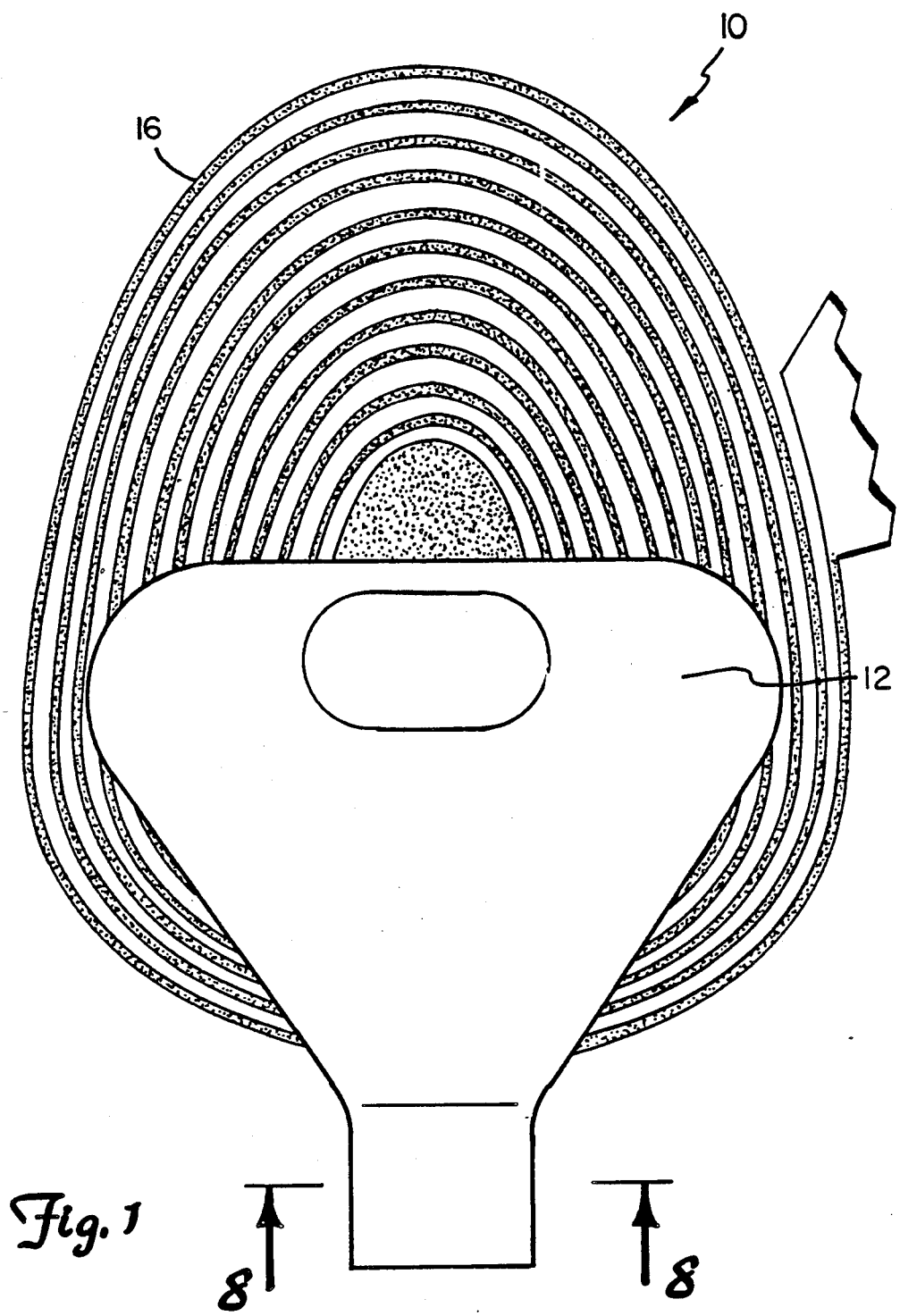
FIG. 1 is a top view of a thin film magnetic read/write head.
Figure 2:
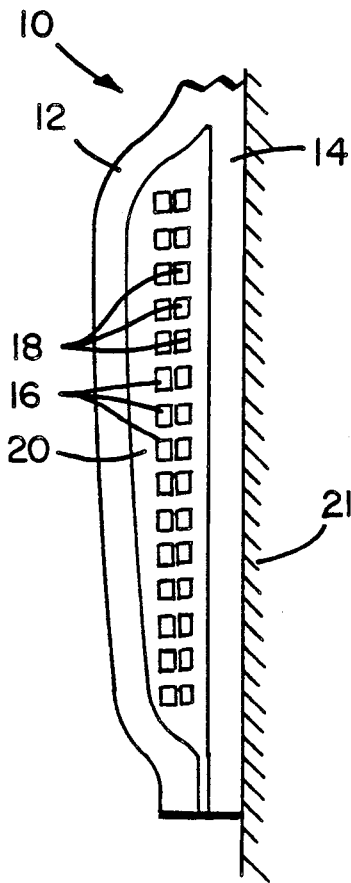
FIG. 2 is a side view of the thin film head of FIG. 1.

The lithographic process used in fabricating thin film heads first involves the definition of the device pattern; i.e., a latent image in the photoresist layer which is then developed out as a relief three-dimensional profile. This relief may then be filled with a portion of the thin film head using standard deposition techniques such as electroplating. A multi-turn inductive thin film head 10 is shown schematically in Figs. 1 and 2 in which FIG. 1 is a top view while FIG. 2 is a side cross sectional view. Lithography is used to define the geometry of both top and bottom magnetic film cores 12 and 14 and copper coils, 16 and 18. Insulating layer 20 is also patterned using lithography. In fabricating the thin film head, several separate pattern transfer processes are used to deposit the head upon a substrate 21 including lift-off, wet chemical etching and plating/sputtering. A typical head building process may account for more than a dozen masking levels and more than thirty processing steps including deposition, plating, and etching.

There are several key parameters in controlling the performance of the device. Throat height and gap length influence the fringing field distribution affecting the linear density and writing efficiency of the head. Optimum device dimensioning requires an in-depth understanding of the micromagnetic phenomenon and extensive device modelling. The line width variation of the top and bottom poles and their alignment accuracy are also crucial because the off-track properties affect the achievable track density.

There are two schemes that may be used in fabricating the magnetic pole, either additive or subtractive. As an illustration, the additive approach using the wet process for electroplating is the dominant scheme and the processing steps involved are summarized below in FIG. 6.

The additive approach does add more processing steps and may induce more process variations such as undercut during chemical etching and ion milling. The maturity of plating technology coupled with a better control of composition and stress in the deposited permalloy film, however, is an advantage of the additive approach. Furthermore, it is a low temperature process in contrast to a sputtering technique.

The highest track density achievable is strongly influenced by how well the pole tip elements can be aligned, and how small the poles can be made with desirable magnetic characteristics. The insatiable need for higher track densities has driven the development of smaller thin film magnetic heads. This is achieved mainly through the reduction of pole tip width, which in turn is reflected in a smaller plating dam width. Magnetic poles typically have a pole length in the range of 2 to 4 $\mu$ms, depending upon the optimization criterion, i.e. a thicker pole for better overwriting efficiency and a thinner pole for better resolution capability. This constraint calls for the use of thick resists with thicknesses targeted in the range of 3 to 6 $\mu$ms. Details of the thick resist requirements for thin film head have been discussed elsewhere. J. S. Gau, Optical/Laser Microlithography II, Proc. SPIE 1088 (1989) pp. 1088-53. Basically, an ideal resist provides good edge acuity under all processing conditions, yields a consistent thickness, and maintains resist profile during high temperature baking and curing, along with its resistance to chemical etching and milling.

Pole width reduction is limited by the resolution of the resist, and the pole tip geometry is determined by the resist profile. In the additive approach, controlling the shape of a resist profile can be as important as maintaining control of its critical dimension. The side profile is of great significance since off-track recording properties are strongly influenced by the side-fringing reading and writing of thin film heads due to their finite dimension. The magnetic field emanating from the side surface during writing, will play a key role in the formation of the side erasure band, depending upon this side-fringing field and corresponding field gradient distribution.

FIG. 3 depicts several common resist profiles. The normal profile, resist 22 in FIG. 3A, is of a typical single layer positive resist and has sloped sidewalls due to absorption and to the nature of the resist development process. The hourglass profile, resist 24 in FIG. 3B, is obtained when the forces competing to make the profile positive and negative are balanced. The negative profile, resist 26 in FIG. 3C, can be obtained using a negative resist. The present invention also teaches a new method of forming resist profile 26 of FIG. 3C using a positive resist.

Usually, vertical resist profiles are the most desirable for pattern transfer and dimensional control. However, negative profiles produced with negative photoresists are sometimes purposely created for metal lift-off. In a normal process, negative profiles produced with negative photoresist can cause problems during etching and critical dimension measurement. Also, high aspect ratio features tend to topple if the profile is too negative. Negative resist tends to provide poor resolution and may have a particularly harsh environmental impact.

Possible pole tip profiles are shown in FIGS. 4A-4C based upon the corresponding resist profiles of plating dams 22-26 of FIGS. 3A-3C. Pole tips 28 and 30 of FIG. 4A are formed using resist profile 22 of FIG. 3A. Pole tips 32 and 34 of FIG. 4B are formed using resist profile 24 of FIG. 3B. Pole tips 36 and 38 of FIG. 4C are formed using resist profile 26 of FIG. 3C.

The positive resist (resist profile 22 in FIG. 3A) based upon novolac resins and diazonapthoquinone photosensitive additives remains the mainstay of the thin film head industry. The sloped sidewalls of resists, however, can have a significant effect upon the width of the resultant pole tip. A 6 $\mu$m thick plating dam comprising photoresist with a slope of 83 degrees can produce a pole tip with a difference between the top and the bottom of 3 $\mu$m pole thickness and at the bottom of only about 0.4 $\mu$m. As the pole widths become smaller and smaller in response to demands for higher track densities, the sloped pole tip starts to have significant impact on head performance. Both the side fringing field and the effective pole width strongly depend upon the degree of sloped walls.

The difference in the width, w, is related to the desired pole thickness, h, and the angle of the sloped profile, $\alpha$, through the following simple equation:

$$w = h \times \tan \alpha \approx h \cdot \alpha$$

A graph of the preceding equation is shown in FIG. 5 for h=1 $\mu$m (line 40), h=2 $\mu$m (line 42) and h=3 $\mu$m (line 44).

In principle, the most critical alignment step in manufacturing the thin film magnetic read/write head lies in the registration between the top and bottom poles. Experimentally, it has been found by a magneto-optic technique that the distribution of the side fringing field and its gradient are influenced by the alignment of poles and control of their critical dimension. (See, M. E. Re, R. R. Katti, W. Rave, and M. H. Kryder, IEEE Trans Mag. MAG-23 (1987) p. 3161.) Furthermore, measurements reveal that an erasure band exists when overwriting a side track which serves as a guard band to avoid off-track interferences. Large step heights and the use of thick resist in thin film heads have constrained the alignment capability of a given lithographic tool to some extent. The requirement of overlay between the top and bottom is estimated to be within 5%–10% of the effective track width. An accuracy in the alignment between the poles of better than 5% tolerance of the effective width may be necessary. The alignment accuracy can be significantly improved by the proved pole tip design of the present invention.

FIGS. 6A–6E and 7A–7G show a side by side comparison between a standard lithographic process used to create a lower pole tip and one possible process used to create the pole tips of the present invention (FIGS. 7A–7G). Other processes, however, such as sputtering, dry etching, etc. may also be used. FIGS. 6A and 7A show substrate 46 and 56 spin coated and soft baked (90° C. for about 45 minutes) with a photoresist layer 48 and 58. In FIGS. 6B and 7B, the photoresist layers 48 and 58 are exposed to actinic radiation. In FIG. 6B, mask 50 covers the area where the pole tip is not to be deposited. In FIG. 7B, on the other hand, mask 60 covers the area where the pole tip is to be deposited. FIGS. 7C and 7D depict two additional steps used with the present invention. In FIG. 7C, the exposed photoresist 58 is post baked. A post bake of 110° C. for 2 to 5 minutes maybe sufficient. In FIG. 7D, following the post bake, photoresist layer 58 is subjected to a flood actinic radiation exposure.

In FIGS. 6C and 7E, photoresist layers 48 and 58 are developed leaving a relief area for deposition of the pole tip. The resultant resist 58 thickness in FIG. 7E may be about 4.2 $\mu$m. Next, in FIGS. 6D and 7F, lower pole tip permalloy magnetic films 52 and 62 are electroplated onto substrate 46 and 56 respectively. Photoresist layers 48 and 58 are then stripped leaving pole tips 52 and 62 as shown in FIGS. 6E and 7G.

Figure 8:
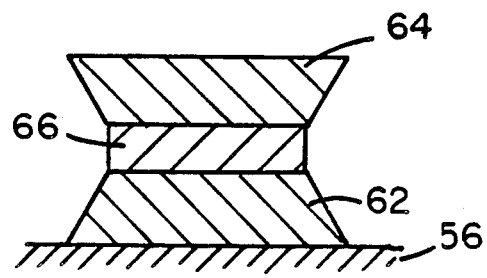
FIG. 8 shows a cross sectional view of the completed pole tips of the present invention having mirror image symmetry across the gap region.

Using the process shown in FIGS. 7A–7G, the resultant permalloy layer 62 has a positive or inverted slope as shown in FIG. 7G. In FIG. 8, pole tip 62 shown formed in FIGS. 7A–7G is shown including a upper pole tip 64 and gap 66. Upper pole 64 may be deposited using the normal process depicted in 6A–6E such that the slope of the edges of upper pole tip 64 are the opposite of that shown for lower pole tip 62. Prior to depositing pole tip 64, gap 66 may be filled with a nonmagnetic material such as alumina ($Al_2O_3$). The symmetric nature of pole tips 62 and 64 leads to improved operation of thin film magnetic head 10 during read back and writing.

In the steps shown in FIGS. 6A–6E, upon exposure to light, the diazoquinone sensitizer (PAC) is converted into the substituted indenecarboxylic acid via the sequence of elimination of nitrogen, Wolff rearrangement to the ketene and reaction with trace amounts of water in the resist. The final product is a carboxylic acid which is very soluble in the basic developer solution, and a positive image is yielded upon development. In order to change the latent positive image of FIGS. 6A–6E, to the negative tone of FIGS. 7A–7G, the indenecarboxylic acid is converted to an aqueous insoluble derivative, i.e. indene, by a decarboxylating step. Indene is not only insoluble in aqueous alkali solution, but it is also inert towards any further photochemical or thermal processing. The rate of this reaction is controlled by the temperature during the post exposure bake step. The indene produced is an aqueous-insoluble species, causing the initially exposed areas to become potentially as insoluble as the unexposed areas. If the decarboxylation step is followed by a flood exposure and aqueous base development using conventional positive resist developers, a negative tone image results. This is because the doubly exposed areas, where the indene product has been formed, were rendered insoluble. Development occurs in the initially unexposed areas because the flood exposure converts the resist in those areas to the normal photochemical products which are base-soluble.

The mechanism of the decarboxylation has been studied and has been found that unlike image reversal systems based upon acid-catalyzed, heat-induced cross linking which tend to favor negative slopes, sidewall profiles of image reversal resists composed of diazonaphthoquinone and novolac resins with addition of aliphatic and aromatic amines can be controlled from negative to vertical to positive by changing the diazo content of the resist and the post exposure bake temperature.

The dimensions of the resultant trapezoidal pole tips have a wide possible range. The angle of the side walls may have little affect on head performance for pole tips having widths and heights of greater than 20 $\mu$m and less than 1 $\mu$m, respectively.

The present invention provides a thin film magnetic head having improved reading and writing characteristics. The mirror image symmetry of the pole tips across the gap region yields a narrow fringe field well suited for high density magnetic storage. The post bake and flood exposure process shown in FIGS. 7A–7G may be easily implemented with current methods used in fabricating thin film heads.

Although the present invention has been described with reference to preferred embodiments, workers skilled in the art will recognize that changes may be made in form and detail without departing from the spirit and scope of the invention. For example, many various possible trapezoidal shapes may be employed having the face closest the gap region narrower than the face distal to the gap region. Additionally, the pole tip heights and the angles between the sides of the trapezoid may also be varied. The invention is applicable to thin film heads having an upper pole smaller than the lower pole.

I claim:
1. A method for manufacturing a pole design for a thin film magnetic read/write head comprising the steps of:
   forming a photoresist layer over a nonmagnetic substrate wherein the photoresist layer comprises a positive photoresist;
   exposing the photoresist layer to radiation through a mask;
   baking the photoresist layer wherein the baking is at a temperature selected to yield a negative profile following a subsequent development step;
   exposing the photoresist layer to radiation;
   developing the photoresist layer to form photoresist dams, whereby the photoresist dams define a trapezoidal cavity, the photoresist dams having faces which form the trapexoidal cavity by sloping toward each other in a direction away from the nonmagnetic substrate;
   depositing a lower thin film magnetic pole tip formed of a magnetic material upon the nonmagnetic substrate which has a generally trapezoidal shape in a cross-section taken generally perpendicular to a plane defined by a surface of the substrate with a first face in surface adjoining contact with the non- magnetic substrate and having a first face length, and a second face distal to the non-magnetic substrate and substantially parallel with the first face and having a second face length, the first face length being greater than the second face length;

removing the photoresist dams from the surface of the non-magnetic substrate;

depositing a non-magnetic gap layer upon the second face of the lower thin film magnetic pole tip which forms a magnetic flux gap; and depositing an upper thin film magnetic pole tip formed of a magnetic material upon the non-magnetic gap layer which has a generally trapezoidal shape in a cross-section taken generally perpendicular to the plane defined by the surface of the non-magnetic substrate with a first face in surface adjoining contact with then on-magnetic gap layer and having a first face length, a second face distal to the non-magnetic gap layer and substantially parallel with the first face and having a second face length, the first face length being less than the second face length, the upper and lower thin film magnetic pole tips forming a magnetic flux path to the magnetic flux gap which creates a fringe field region, whereby magnetic fields proximate the fringe field region and are coupled to the upper and lower thin film magnetic pole tips through the magnetic flux gap.

2. The method of claim 1 wherein the upper thin film magnetic pole tip is deposited using positive photoresist and has generally mirror image symmetry with the lower thin film magnetic pole tip.

* * * * *

UNITED STATES PATENT AND TRADEMARK OFFICE
CERTIFICATE OF CORRECTION

PATENT NO. : 5,126,232

DATED : June 30, 1992

INVENTOR(S) : GEORGE J.S. GAU

It is certified that error appears in the above-identified patent and that said Letters Patent is hereby corrected as shown below:

```
Col. 7, line 17, delete "then", insert "the"

Col. 7, line 17, delete "on-magnetic", insert "non-magnetic"
```

Signed and Sealed this

Tenth Day of August, 1993

Attest:

MICHAEL K. KIRK

Attesting Officer     Acting Commissioner of Patents and Trademarks